July 28, 1931. M. J. ADAMS 1,816,201
SPOKE TENON AND FELLY CLIP
Filed Nov. 23, 1928
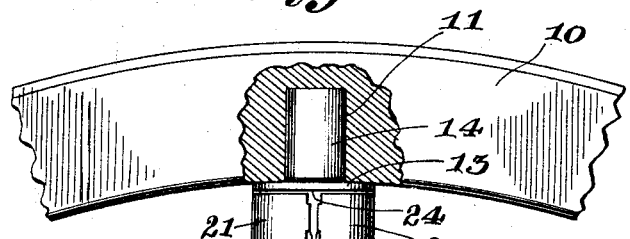
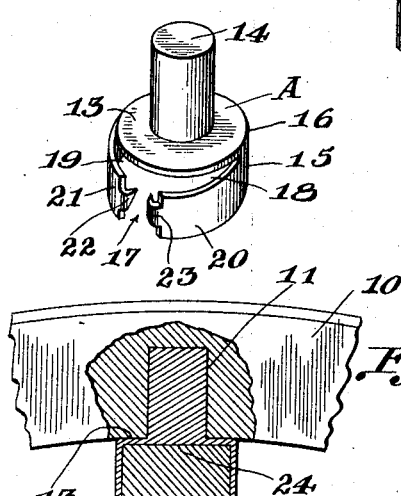
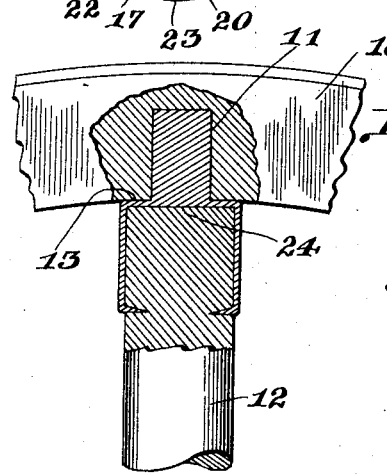
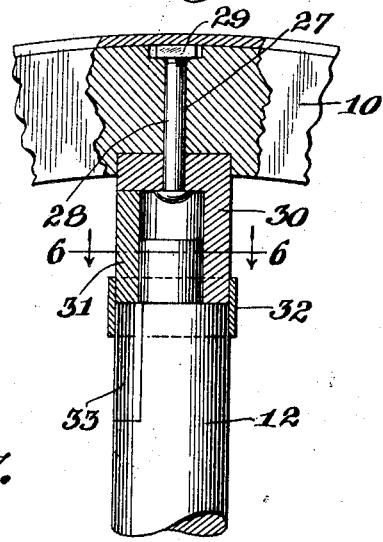
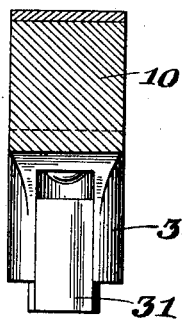
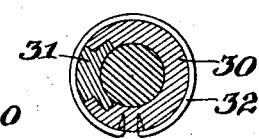
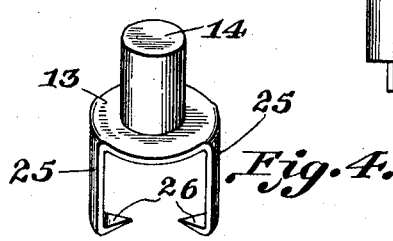
Inventor
MATHIAS J. ADAMS
By Oscar A. Michel
Attorney Patented July 28, 1931

1,816,201

UNITED STATES PATENT OFFICE

MATHIAS J. ADAMS, OF TURKEY RIVER, IOWA

SPOKE-TENON AND FELLY-CLIP

Application filed November 23, 1928. Serial No. 321,437.

This invention relates to a spoke-tenon and felly-clip.

The main object of the present device is to provide an improved connection between the spoke and the felly which can be quickly and easily connected whenever a spoke in a wheel is broken or damaged without disassembling the entire wheel.

A further object is to improve the construction of devices of this character for connecting the outer end of a spoke to a felly and to provide a simple, inexpensive and efficient device which can be applied to both new and old wheels and which is adapted to firmly grip both a spoke and a felly whereby the spoke will be securely fastened to the felly and effectually prevented from becoming loose.

A still further object is to provide means so designed that in repairing wheels the necessity of substituting a new spoke for a spoke broken off at the tenon is obviated and to provide a device capable of being placed on the outer end of the spoke without removing the latter from the wheel and which is capable of providing a firm bearing upon the entire width of the felly.

With these and other objects in view, as will hereinafter appear, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is an elevational view of a portion of a wheel felly and a portion of a spoke showing the same connected by my improved device.

Figure 2 is a perspective view of the connection itself.

Figure 3 is a part elevational and part cross sectional view of a modified connection.

Figure 4 is a perspective view of the connection shown in Figure 3.

Figure 5 is a part elevational and part sectional view of a further modified form of connection.

Figure 6 is a cross sectional view on the section line 6—6 of Figure 5 looking in the direction of the arrows, and Figure 7 is a part sectional and part side view of the modified form shown in Figure 5.

In the drawings similar reference characters refer to like parts.

Referring to the drawings a part of the felly of the wheel is indicated at 10. A circular socket is indicated at 11 although any other type of socket may be used instead. A portion of the spoke is indicated at 12.

The connecting device is shown in Figure 2 in detached condition and is indicated generally by the character A. Projecting upwardly from a disk 13 is a solid projection 14 which is of cylindrical character in order to fit the socket 11 but it may be of any other form capable of fitting the type of socket provided in the felly 10. Preferably the projection 14 is made slightly larger than the socket 11 so that it is necessary to drive the same into the socket 11 by means of a hammer or other instrument in order that a very tight fit is made.

Projecting downwardly from the disk 13 is a flange 15 which is integral with the disk 13 preferably for about one-half the periphery thereof as indicated at 16. The flange 15 is divided at 17 and on each side of the division 17 the flange is separated by the cuts 18 and 19 from the disk 13 thereby forming two flexible flaps 20 and 21.

The flaps 20 and 21 have formed on the ends thereof prongs 22 and 23 which may be of any desired type.

The spoke 12 shown has had the tenon thereof broken off and the top surface 24 of the spoke has been planed smooth.

The operation and assembling of this form of the invention is as follows: Upon the breaking off of the tenon of the spoke 12 because of an accident or any other reason the top of the spoke 12 is smoothly planed off as shown at 24. The projection 14 of the connection is then forced into the socket 11 until the disk 13 comes into contact with the inner periphery of the felly. It will be noted that the diameter of the disk 13 is preferably equal to the width of the felly. The flaps 20 and 21 are spread apart so as to allow of the insertion of the spoke 12 within the device until the spoke 12 comes in contact with the integral portion 16 of the flange 15. The flaps 20 and 21 are then bent inwardly and the prongs 22 and 23 driven into the material of the spoke.

By the means just described it is evident that a peculiarly firm and capable connection has been provided between the spoke and the felly without the necessity of having any tenon upon the spoke.

In Figures 3 and 4 a modification of the invention is shown in which the disk 13 has instead of the flange 15 two or more projections 25 depending downwardly therefrom. The projections 25 terminate in prongs 26. The operation of this modification is similar to that shown in Figures 1 and 2 above described. In this case the projections 25 are bent outwardly prior to the insertion of the spoke between the same and are then forced inwardly and the prongs 26 driven into the material of the spoke.

In Figures 5, 6 and 7 a further modification is shown which accomplishes more or less similar functions to the modifications previously described. In this case an aperture 27 is drilled completely through the felly through which a bolt 28 secured by the nut 29 is adapted to pass. The bolt 28 maintains in fixed relation to the felly a socket member 30 into which the spoke 12 may be inserted and secured therein by means of a slide 31 and a ring 32. The operation of this modification is believed to be self-evident in view of the previous descriptions given.

Some changes may be made in the construction and arrangement of the invention above set forth without departing from the real purpose and spirit thereof, and it is the intention to cover by the following claim, any modified forms of structure or use of equivalents, which may be reasonably included within their scope.

I claim:

A spoke holding felly-clip comprising a disk member, means securing said member to the felly, a flange projecting from the other side of said member, said flange structurally integral with the disk for a fraction of its circumference, the remaining portion of the flange divided to form flexible fingers, and means on each of the fingers adapted to be attached to the spoke.

In testimony whereof I hereunto affix my signature.

MATHIAS J. ADAMS.